A. E. BRIGHT.
NUT LOCK.
APPLICATION FILED APR. 21, 1914.
1,129,787. Patented Feb. 23, 1915.
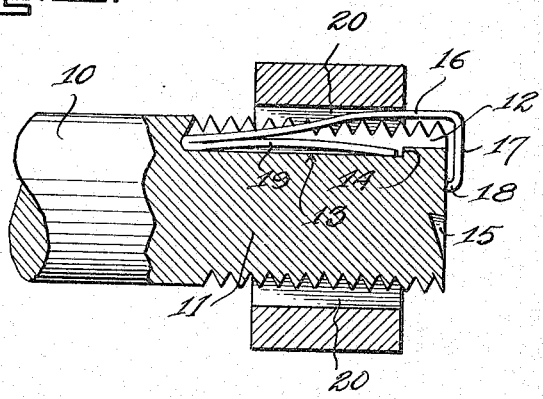
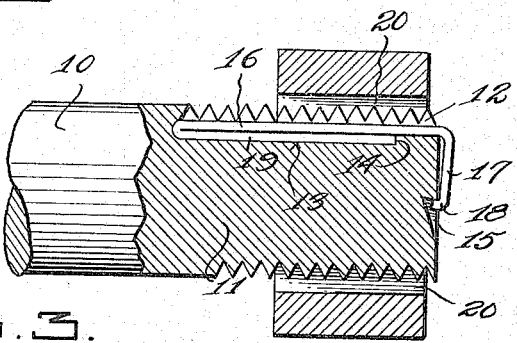
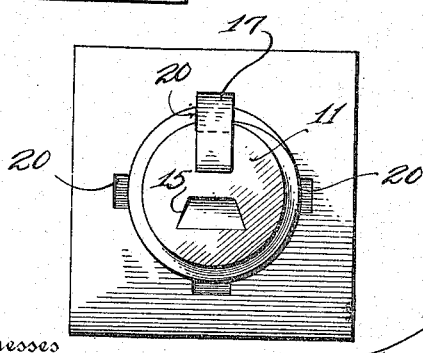
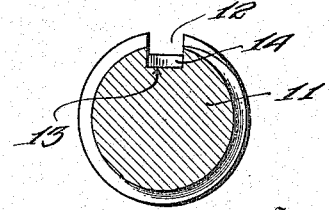
Witnesses
S. P. Marston
Ross J. Woodward
Inventor
Albert E. Bright,
By Richard Owen.
Attorney

UNITED STATES PATENT OFFICE.

ALBERT E. BRIGHT, OF IDAGROVE, IOWA.

NUT-LOCK.

1,129,787.

Specification of Letters Patent.

Patented Feb. 23, 1915.

Application filed April 21, 1914. Serial No. 833,555.

*To all whom it may concern:*

Be it known that I, ALBERT E. BRIGHT, a citizen of the United States, residing at Idagrove, in the State of Iowa, have invented certain new and useful Improvements in Nut-Locks, of which the following is a specification.

This invention relates to a nut lock, and the principal object of the invention is to provide an improved type of locking tongue which is removably mounted in a slot formed in the threaded portion of the bolt, and is so mounted that it can not slip out of place when the nut is tightened.

Another object of the invention is to provide improved means for holding the locking tongue in a released position so that the nut can be removed, the locking tongue being so constructed and mounted that it can not slip out of place when the nut is removed thus preventing any danger of the locking strip dropping from the bolt and becoming lost while removing the bolt from a piece of machinery.

This invention is illustrated in the accompanying drawings wherein—

Figure 1 is a fragmentary sectional view showing the nut locked upon the bolt; Fig. 2 is a view similar to Fig. 1 showing the locking tongue moved to an inoperative position; Fig. 3 is a view in end elevation of a bolt and nut locked upon the bolt by means of the improved locking tongue; Fig. 4 is a transverse sectional view through the bolt.

The bolt 10 has its threaded end 11 provided with longitudinally-extending slot 12 which is deepened through the greater portion of its length to form a pocket 13 having an abutment shoulder 14 at its forward end. The end of the bolt is provided with a notch 15 so that the locking tongue may be releasably held in an inoperative position shown in Fig. 2. This locking tongue 16 is formed from a strip of resilient material, preferably steel or some other metal, and is bent adjacent one end to form a bill 17 provided with a tooth 18 adapted to fit into the notch 15. The opposite end portion of the locking strip 16 is doubled back upon itself and bowed to form the anchor 19 which fits into the pocket 13. This anchor 19 is of such length that when compressed as shown in Fig. 2, it will take up practically the entire length of the pocket 13 and thus securely hold the locking strip in place as shown in Fig. 2.

When this device is in use, the bolt is first passed through the article to be secured and the nut is then screwed tightly upon the bolt until the nut is tightened as much as desired. It will be noted that the nut must be brought to a stop with one of the grooves 20 registering with the slot 12, thus permitting the locking strip to be inserted to assume the position shown in Fig. 1. It is of course obvious that if desired, the locking strip may be placed in the slot 12 before the nut is put in place and moved to the inoperative position as shown in Fig. 2 and the nut then screwed upon the bolt. The bill 17 would then be moved to release the tooth 18 from the notch 15 and permit the locking strip to move to the operative position. When it is desired to remove the nut, the bill will be pressed toward the notch 15 until the tooth 18 enters the notch where it will be held by the resiliency of the locking strip. When this locking strip is moved to the position shown in Fig. 2 anchor 19 will be compressed and through frictional engagement securely hold the locking strip in place. The nut can then be removed without any danger of the locking strip dropping out of the slot in case the locking strip happens to be positioned upon the under side of the bolt. The locking tongue will therefore not drop upon the ground and become lost or get covered with dust and dirt.

What is claimed is:

1. A nut lock comprising a bolt having its threaded end portion provided with a longitudinally-extending groove deepened throughout the greater portion of its length to form a pocket terminating in an abutment shoulder at its outer end, the outer end of said bolt being provided with a notch, a nut threaded upon said bolt and provided with a groove in the wall of its threaded opening for registering with the groove of said bolt, and a locking strip formed of a strip of resilient material bent adjacent one end to form a bill terminating in a tooth for entering said notch, the opposite end portion of said strip of resilient material being bent back upon itself and bowed to form an anchor fitting into said pocket, the outer leaf of said locking strip compressing said anchor in said pocket when said locking strip is moved to an inoperative position to bring the free end of said anchor into engagement with said abutment shoulder to hold said locking strip in place when said nut is removed.

2. A nut lock comprising a bolt having its threaded end portion provided with a longitudinally-extending groove deepened throughout the greater portion of its length to form a pocket, a nut threaded upon said bolt and having the wall of its threaded opening provided with a groove for registering with the groove of said bolt, a resilient locking member extending through the grooves of said nut and bolt and having its inner end portion provided with an anchor fitting into said pocket, the outer end portion of said locking member being provided with means for releasably engaging said bolt to releasably hold said locking member in an inoperative position and expand said anchor in said pocket and releasably hold said locking member in place by frictional engagement when said nut is removed.

3. A nut lock comprising a bolt having its threaded end portion provided with a longitudinally-extending groove deepened to form a pocket, a nut threaded upon said bolt and provided with a groove registering with the groove of said bolt, and a locking member formed of resilient material extending through the grooves of said nut and bolt and having its inner end portion formed into an anchor fitting into said pocket, and means for releasably holding said locking member in an inoperative position to permit said nut to be removed and to expand said anchor in said pocket to cause said anchor to hold said locking member in place by frictional engagement with the ends of said pocket when said nut is removed.

4. A nut lock comprising a bolt provided with a longitudinally-extending groove deepened to provide a pocket, a nut carried by said bolt and provided with a groove registering with the groove of said bolt, a resilient locking strip extending through the grooves of said nut and bolt and provided with an anchor extending into said pocket, and means for releasably holding said locking strip in an inoperative position to permit removal of said nut and expand said anchor in said pocket to releasably hold said locking strip in engagement with said bolt by the frictional engagement between said anchor and the walls of said pocket.

In testimony whereof I affix my signature in presence of two witnesses.

ALBERT E. BRIGHT.

Witnesses:
JOHN T. PETERSEN,
R. E. SMITH.

Copies of this patent may be obtained for five cents each, by addressing the "Commissioner of Patents, Washington, D. C."